US012695312B2

(12) United States Patent (10) Patent No.: US 12,695,312 B2
Chan et al. (45) Date of Patent: Jul. 28, 2026

(54) POWER SUPPLY WITH DUAL CONVERSION CIRCUITS AND DISCHARGE PATH FOR OUTPUT CAPACITORS

(71) Applicant: Acer Incorporated, New Taipei City (TW)

(72) Inventors: Tzu-Tseng Chan, New Taipei City (TW); Chih-Chiang Chen, New Taipei City (TW); Chuan-Jung Wang, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 932 days.

(21) Appl. No.: 18/053,976

(22) Filed: Nov. 9, 2022

(65) Prior Publication Data

US 2023/0261508 A1 Aug. 17, 2023

(30) Foreign Application Priority Data

Feb. 16, 2022 (TW) .................................. 111105530

(51) Int. Cl.
*H02J 7/34* (2006.01)
*H02J 7/00* (2006.01)
(Continued)

(52) U.S. Cl.
CPC .............. *H02J 7/345* (2013.01); *H02J 7/855* (2026.01); *H02J 7/927* (2026.01); *H02M 7/219* (2013.01)

(58) Field of Classification Search
CPC ....................................................... H02J 7/345
(Continued)

(56) References Cited

U.S. PATENT DOCUMENTS 6,204,633 B1 3/2001 Kitagawa
8,416,584 B2 * 4/2013 Zhan ................. H02M 3/33507
363/21.12
(Continued)

FOREIGN PATENT DOCUMENTS

CN 101494388 B 7/2011
TW 201134045 A 10/2011

OTHER PUBLICATIONS

Chinese language office action dated Oct. 18, 2022, issued in application No. TW 111105530.

*Primary Examiner* — Yalkew Fantu
(74) *Attorney, Agent, or Firm* — McClure, Qualey & Rodack, LLP

(57) ABSTRACT

A power supply including a first conversion circuit, a second conversion circuit, a first output capacitor, a second output capacitor, a first discharge circuit, and a second discharge circuit is provided. The first conversion circuit converts a first alternating current (AC) power to a first direct current (DC) power. The second conversion circuit converts a second AC power to a second DC power. The first output capacitor is configured to store the first DC power. The second output capacitor is configured to store the second DC power. The first discharge circuit provides a first discharge path to discharge the first output capacitor in response to the first DC power being greater than the second DC power. The second discharge circuit provides a second discharge path to discharge the second output capacitor in response to the second DC power being greater than the first DC power.

16 Claims, 8 Drawing Sheets

100B

100A

(51) Int. Cl.
  *H02J 7/90* (2026.01)
  *H02M 7/219* (2006.01)

(58) Field of Classification Search
  USPC ......................................................... 320/166
  See application file for complete search history.

(56) References Cited

U.S. PATENT DOCUMENTS

| | | | |
|---|---|---|---|
| 8,890,374 | B2 | 11/2014 | Lai et al. |
| 2007/0138971 | A1* | 6/2007 | Chen ................... H05B 39/045 |
| | | | 315/209 R |
| 2011/0115298 | A1 | 5/2011 | Oga |
| 2018/0166910 | A1* | 6/2018 | Sun ......................... B60L 53/20 |
| 2020/0177089 | A1* | 6/2020 | Abdel-Rahman ....... H02M 1/36 |

* cited by examiner

100A

POWER SUPPLY WITH DUAL CONVERSION CIRCUITS AND DISCHARGE PATH FOR OUTPUT CAPACITORS

CROSS REFERENCE TO RELATED APPLICATIONS

This application claims priority of Taiwan Patent Application No. 111105530, filed on Feb. 16, 2022, the entirety of which is incorporated by reference herein.

BACKGROUND OF THE INVENTION

Field of the Invention

The invention relates to a power supply, and more particularly to a power supply that comprises discharge circuits.

Description of the Related Art

The types and functions of electronic devices have increased as technology has developed. Generally, an external charge device (e.g., an adapter) converts a mains supply to a direct current (DC) power and then provides the DC power to an electronic device. The external charge device usually comprises an output capacitor to store the DC power. However, the output capacitor has a large capacitance. When the external charge device stops converting the mains supply, there is still a large voltage remaining in the output capacitor. Therefore, the electronic device mistakenly thinks that the external charge device is still converting the mains supply, and the electronic device does not enter battery mode. Additionally, the voltage remaining in the output capacitor of the external charge device may trigger the electronic device's over-voltage protection mechanism, causing the electronic device to suddenly shut down.

BRIEF SUMMARY OF THE INVENTION

In accordance with an embodiment of the disclosure, a power supply comprises a first conversion circuit, a second conversion circuit, a first output capacitor, a second output capacitor, a first discharge circuit, and a second discharge circuit. The first conversion circuit converts a first alternating current (AC) power to a first direct current (DC) power. The second conversion circuit converts a second AC power to a second DC power. The first output capacitor is configured to store the first DC power. The second output capacitor is configured to store the second DC power. The first discharge circuit provides a first discharge path to discharge the first output capacitor in response to the first DC power being greater than the second DC power. The second discharge circuit provides a second discharge path to discharge the second output capacitor in response to the second DC power being greater than the first DC power.

In accordance with another embodiment of the disclosure, a control system comprises a first power supply, a second power supply, and a system load. The first power supply comprises a first input terminal, a first conversion circuit, a first output capacitor, a first discharge circuit, and a first output terminal. The first input terminal is configured to receive a first AC power. The first conversion circuit converts the first AC power to a first DC power. The first output capacitor is configured to store the first DC power. The first discharge circuit creates a first discharge path to discharge the first output capacitor in response to the first DC power being greater than a second DC power. The first output terminal is configured to output the first DC power. The second power supply comprises a second input terminal, a second conversion circuit, a second output capacitor, a second discharge circuit, and a second output terminal. The second input terminal is configured to receive a second AC power. The second conversion circuit converts the second AC power to the second DC power. The second output capacitor is configured to store the second DC power. The second discharge circuit creates a second discharge path to discharge the second output capacitor in response to the second DC power being greater than the first DC power. The second output terminal is configured to output the second DC power. The system load comprises a first interface and a second interface. The first interface comprises a first power-receiving terminal and a first connection terminal. In response to the first output terminal being coupled to the first interface, the first power-receiving terminal receives the first DC power and the first connection terminal is connected to the first discharge circuit. The second interface comprises a second power-receiving terminal and a second connection terminal. The second power-receiving terminal is electrically connected to the first power-receiving terminal. The second connection terminal is electrically connected to the first connection terminal. In response to the second output terminal being coupled to the second interface, the second power-receiving terminal receives the second DC power and the second connection terminal is connected to the second discharge circuit.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1A:
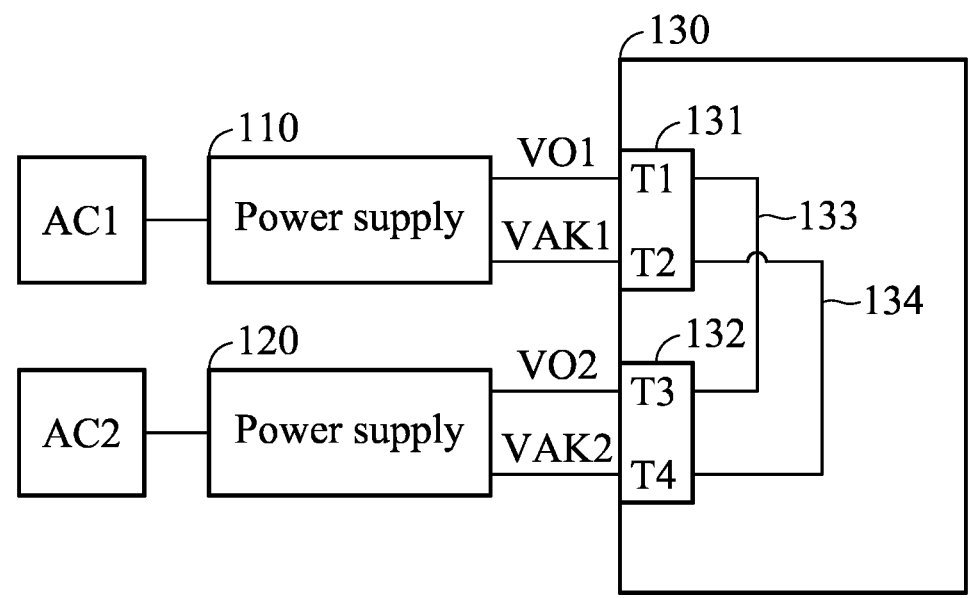
FIG. 1A is a schematic diagram of an exemplary embodiment of a control system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of a control system according to various aspects of the present disclosure. The control system 100A comprises power supplies 110 and 120, and a system load 130. The power supplies 110 and 120 may individually or jointly provide power to the system load 130. In this embodiment, the power supply 110 receives and converts an alternating current (AC) power AC1 to generate a direct current (DC) power VO1. In some embodiment, the power supply 110 further generates an output voltage VAK1. In this case, the output voltage VAK1 is associated with the DC power VO1. For example, the output voltage VAK1 is increased as the DC power VO1 increases, or the output voltage VAK1 is reduced as the DC power VO1 reduces.

The power supply 120 receives and converts an AC power AC2 to generate a DC power VO2. In some embodiment, the power supply 120 generates an output voltage VAK2 according to the DC power VO2. The output voltage VAK2 is associated with the DC power VO2. For example, the output voltage VAK2 is increased as the DC power VO2 increases, or the output voltage VAK2 is reduced as the DC power VO2 reduces.

In one embodiment, the AC power AC1 is the same as the AC power AC2. For example, the AC powers AC1 and AC2 are the mains supply. In other embodiments, when the DC power VO2 is equal to the DC power VO1, the output voltage VAK2 is equal to the output voltage VAK1.

The system load 130 comprises interfaces 131 and 132. The interface 131 is configured to be coupled to the power supply 110. The interface 132 is configured to be coupled to the power supply 120. When the system load 130 is not coupled to the power supplies 110 and 120, the system load 130 enters a DC mode. In the DC mode, the system load 130 operates according to the power of the built-in rechargeable battery (not shown). In other embodiment, even if the system load 130 is coupled to the power supplies 110 and 120 which do not receive the AC powers AC1 and AC2, the system load 130 also operates in the DC mode.

When the power supply 110 is coupled to the interface 131 and receives the AC power AC1 or the power supply 120 is coupled to the interface 132 and receives the AC power AC2, the system load 130 receives the DC power VO1 from the power supply 110 or the DC power VO2 from the power supply 120 and operates in an AC mode. In the AC mode, the system load 130 operates according to the DC power VO1 or VO2. In other embodiments, when the power supply 110 is coupled to the interface 131 and receives the AC power AC1 and the power supply 120 is coupled to the interface 132 and receives the AC power AC2, the system load 130 operates according to the DC powers VO1 and VO2.

The interface 131 comprises a power-receiving terminal T1 and a connection terminal T2. The power-receiving terminal T1 is configured to receive the DC power VO1. The connection terminal T2 is configured to receive the output voltage VAK1. The interface 132 comprises a power-receiving terminal T3 and a connection terminal T4. The power-receiving terminal T3 is configured to receive the DC power VO2. The connection terminal T4 is configured to receive the output voltage VAK2. In some embodiments, the interfaces 131 and 132 are power jacks, but the disclosure is not limited thereto. In other embodiments, the type of interface 131 is different from the type of the interface 132. For example, the interface 131 is a USB Type-C connector, and the interface 132 is a power jack.

In this embodiment, the system load 130 further comprises routings 133 and 134. The routing 133 is electrically connected to the power-receiving terminals T1 and T3. Therefore, when the power supply 110 is coupled to the interface 131 and the power supply 120 is coupled to the interface 132, the power supplies 110 and 120 are connected to each other in parallel to supply power to the system load 130. The routing 134 is electrically connected to the connection terminals T2 and T4. When the power supply 110 is coupled to the interface 131 and provides the DC power VO1 and the power supply 120 is coupled to the interface 132 and provides the DC power VO2, the output voltage VAK1 is about equal to the output voltage VAK2. The kind of system load 130 is not limited in the present disclosure. In one embodiment, the system load 130 is a notebook computer or a gaming computer.

Figure 1B:
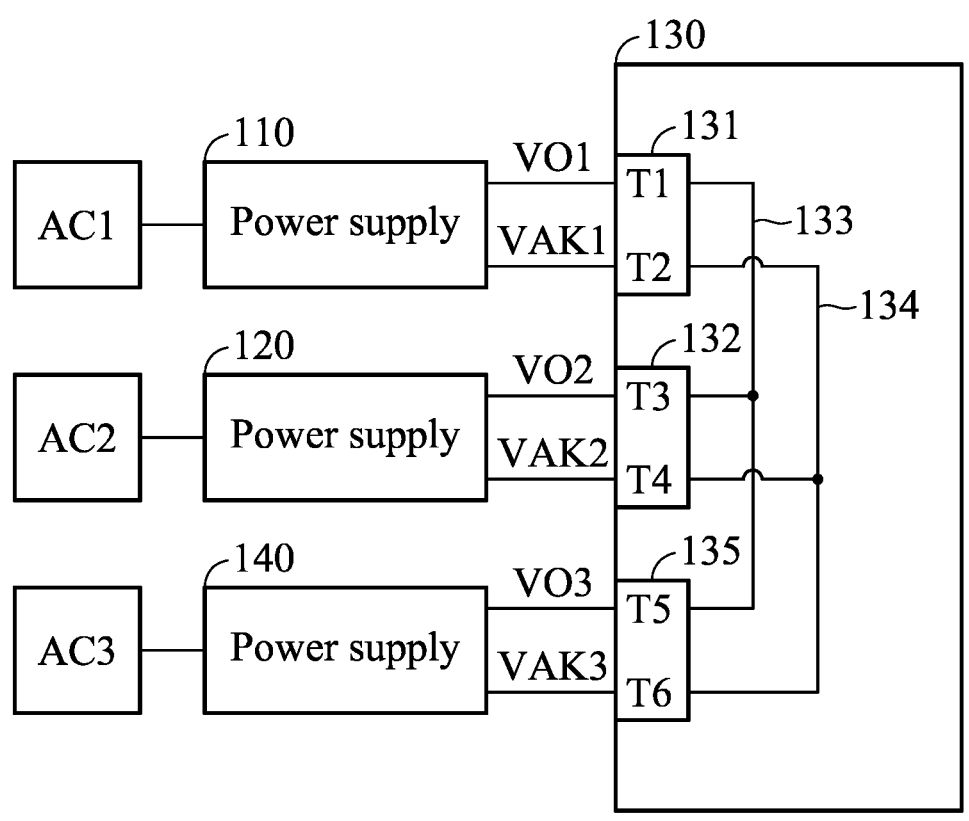
FIG. 1B is a schematic diagram of another exemplary embodiment of the control system according to various aspects of the present disclosure.

The number of power supply is not limited in the present disclosure. In other embodiments, the control system 100A comprises more power supplies. FIG. 1B is a schematic diagram of another exemplary embodiment of the control system according to various aspects of the present disclosure. FIG. 1B is similar to FIG. 1A with the exception that the control system 100B comprises power supplies 110, 120 and 140.

The power supply 140 receives and converts an AC power AC3 to generate a DC power VO3. In some embodiments, the AC powers AC1~AC3 are mains supply and the DC powers VO1~VO3 are the same, such as 19.5V. In this case, the error value of each of the DC powers VO1~VO3 is about ±5%.

In other embodiment, the power supply 140 generates an output voltage VAK3 according to the DC power VO3. The output voltage VAK3 is changed as the DC power VO3 changes. For example, when the DC power VO3 increases, the output voltage VAK3 is increased. When the DC power VO3 decreases, the output voltage VAK3 is decreased. Since the characteristics of the power supply 140 shown in FIG. 1B is similar to the characteristics of the power supply 110 shown in FIG. 1, the related description is omitted here.

In this embodiment, the system load 130 further comprises an interface 135. The interface 135 comprises a power-receiving terminal T5 and a connection terminal T6. When the power supply 140 is coupled to the interface 135, the power-receiving terminal T5 receives the DC power VO3, and the connection terminal T6 receives the output voltage VAK3. In such cases, the routing 133 is electrically connected to the power-receiving terminals T1, T3, and T5, and the routing 135 is electrically connected to the connection terminals T2, T4, and T6.

Figure 2:
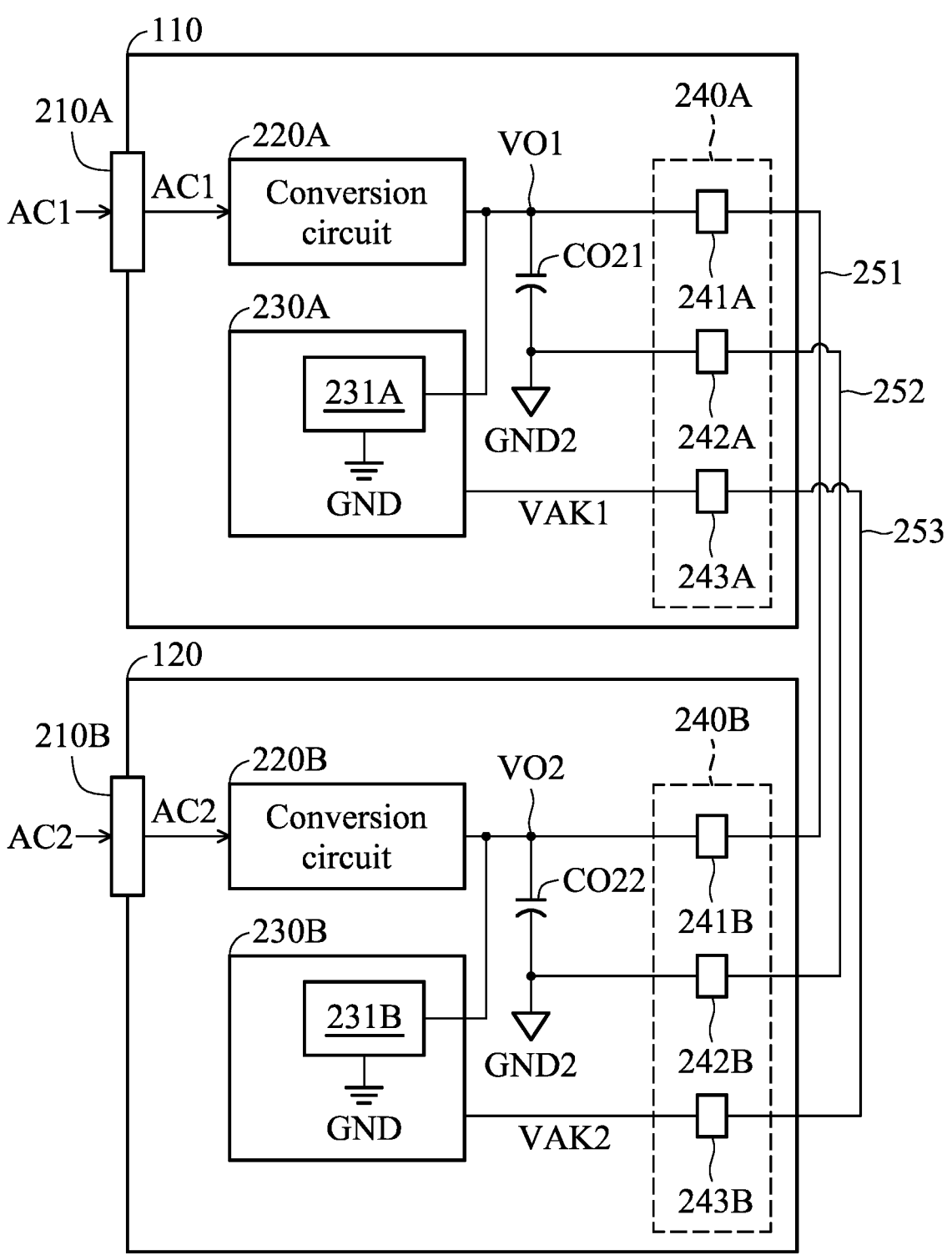
FIG. 2 is a schematic diagram of an exemplary embodiment of a power supply according to various aspects of the present disclosure.

FIG. 2 is a schematic diagram of an exemplary embodiment of the power supplies 110 and 120 according to various aspects of the present disclosure. Since the circuit structures of the power supplies 110, 120 and 140 are the same, FIG. 2 shows the circuit structures of the power supplies 110 and 120. In some embodiments, the power supplies 110 and 120 are integrated into a single power supply, the single power supply is disposed in a holding.

In this embodiment, the power supply 110 comprises an input terminal 210A, a conversion circuit 220A, a discharge circuit 230A, a output capacitor CO21, and an output terminal 240A. The input terminal 210A receives the AC power AC1. The conversion circuit 220A converts the AC power AC1 to the DC power VO1. The output capacitor CO21 is coupled to a ground terminal GND2 and stores the DC power VO1. The discharge circuit 230A is coupled to the output capacitor CO21 and generates the output voltage VAK1. The output terminal 240A outputs the DC power VO1 and the output voltage VAK1. In one embodiment, the output terminal 240A comprises pins 241A-243A. The pin 241A receives the DC power VO1. The pin 242A is coupled to the ground terminal GND2. The pin 243A receives the output voltage VAK1. In some embodiments, the output terminal 240A is a power jack.

The power supply 120 comprises an input terminal 210B, a conversion circuit 220B, a discharge circuit 230B, a output capacitor CO22, and an output terminal 240B. The input terminal 210B receives the AC power AC2. The conversion circuit 220B converts the AC power AC2 to the DC power VO2. The output capacitor CO22 is coupled to the ground terminal GND2 and stores the DC power VO2. The discharge circuit 230B is coupled to the output capacitor CO22 and generates the output voltage VAK2. The output terminal 240B outputs the DC power VO2 and the output voltage VAK2. In one embodiment, the output terminal 240B comprises pins 241B-243B. The pin 241B receives the DC power VO2. The pin 242B is coupled to the ground terminal GND2. The pin 243B receives the output voltage VAK2. In some embodiments, the output terminal 240B is a power jack.

In other embodiments, a system load (e.g., 130) is electrically connected to the output terminals 240A and 240B. In such cases, the system load comprises routings 251~253. The routing 251 is electrically connected to the pins 241A and 241B. The routing 252 is electrically connected to the pins 242A and 242B. The routing 253 is electrically connected to the pins 243A and 243B.

When the power supply 110 receives the AC power AC1 and the power supply 120 receives the AC power AC2, the DC power VO1 is about equal to the DC power VO2. Therefore, the output voltage VAK1 is about equal to the output voltage VAK2. However, when the power supplies 110 and 120 do not receive the AC powers AC1 and AC2, the DC power VO1 is not equal to the DC power VO2, and the output voltage VAK1 is not equal to the output voltage VAK2.

When the DC power VO1 is larger than the DC power VO2, the output voltage VAK1 is larger than the output voltage VAK2. Therefore, the discharge circuit 230A creates a discharge path 231A to discharge the output capacitor CO21. In this case, the charges of the output capacitor CO21 is released via the discharge path 231A to the ground terminal GND. Therefore, the DC power VO1 is reduced. When the DC power VO2 is larger than the DC power VO1, the output voltage VAK2 is larger than the output voltage VAK1. Therefore, the discharge circuit 230B creates a discharge path 231B to discharge the output capacitor CO22. In this case, the charges of the output capacitor CO22 is released via the discharge path 231B to the ground terminal GND. Therefore, the DC power VO2 is reduced.

Figure 3A:
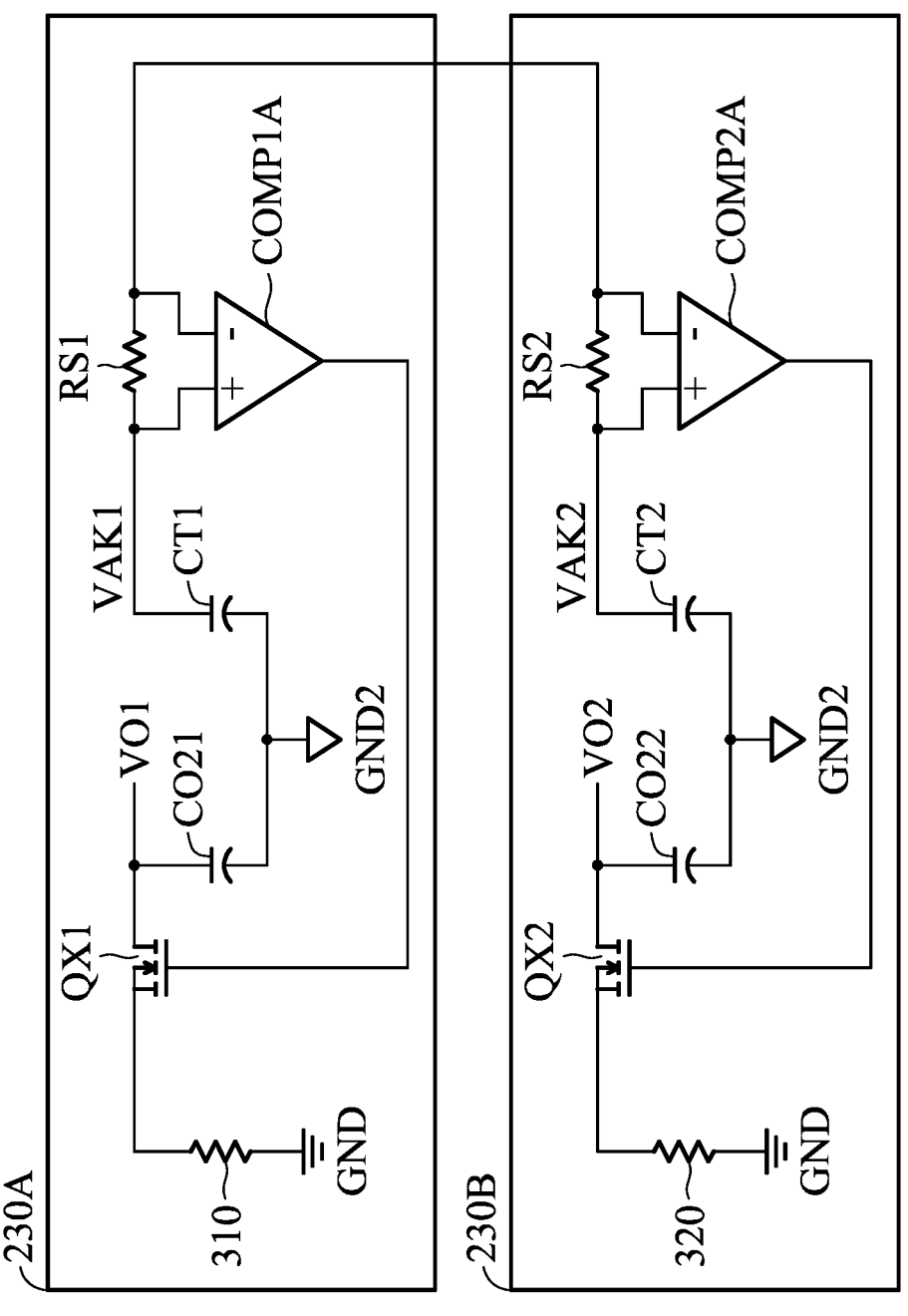
FIG. 3A is a schematic diagram of an exemplary embodiment of a discharge circuit according to various aspects of the present disclosure.

FIG. 3A is a schematic diagram of an exemplary embodiment of the discharge circuits 230A and 230B according to various aspects of the present disclosure. The discharge circuit 230A comprises a discharge switch QX1, a resistance element 310, a comparator circuit COMP1A, and a detection resistor RS1. The discharge switch QX1 is coupled to the output capacitor CO21. In this embodiment, the discharge switch QX1 is an N-type transistor. The resistance element 310 is coupled between the discharge switch QX1 and the ground terminal GND. In this embodiment, the resistance element 310 is a resistor. The detection resistor RS1 is coupled between the non-inverting input terminal and the inverting input terminal of the comparator circuit COMP1A.

The resistance value of the detection resistor RS1 is about 1Ω, and the error value of the resistance value of the detection resistor RS1 is about ±1%. The output terminal of the comparator circuit COMP1A is coupled to the discharge switch QX1.

The discharge circuit 230B comprises a discharge switch QX2, a resistance element 320, a comparator circuit COMP2A, and a detection resistor RS2. The discharge switch QX2 is coupled to the output capacitor CO22. In this embodiment, the discharge switch QX2 is an N-type transistor. The resistance element 320 is coupled between the discharge switch QX2 and the ground terminal GND. In this embodiment, the resistance element 320 is a resistor. The detection resistor RS2 is coupled between the non-inverting input terminal and the inverting input terminal of the comparator circuit COMP2A. The resistance value of the detection resistor RS1 is about 2Ω, and the error value of the resistance value of the detection resistor RS2 is about ±1%. The output terminal of the comparator circuit COMP2A is coupled to the discharge switch QX2.

When the DC power VO1 is equal to the DC power VO2, since the output voltage VAK1 is equal to the output voltage VAK2, no current passes through the detection resistors RS1 and RS2. At this time, since the voltage of the inverting input terminal of the comparator circuit COMP1A is equal to the non-inverting input terminal of the comparator circuit COMP1A, the comparator circuit COMP1A is turned off. Therefore, the discharge switch QX1 is turned off. Similarly, the voltage of the inverting input terminal of the comparator circuit COMP2A is equal to the non-inverting input terminal of the comparator circuit COMP2A so that the comparator circuit COMP2A is turned off. Therefore, the discharge switch QX2 is turned off.

However, when the DC power VO1 is larger than the DC power VO2, since the voltage (e.g., the output voltage VAK1) of the regulator capacitor CT1 is larger than the voltage (e.g., the output voltage VAK2) of the regulator capacitor CT2, the regulator capacitor CT1 is discharge toward the regulator capacitor CT2. At this time, the voltage of the non-inverting input terminal of the comparator circuit COMP1A is larger than the inverting input terminal of the comparator circuit COMP1A. Therefore, the comparator circuit COMP1A outputs a high level to turn on the discharge switch QX1. When the discharge switch QX1 is turned on, the discharge switch QX1 and the resistance element 310 form a discharge path. The voltage VO1 of the output capacitor CO21 is released through the discharge switch QX1 and the resistance element 310 to the ground terminal GND. Therefore, the voltage VO1 of the output capacitor CO21 is decreased gradually. At this time, since the regulator capacitor CT1 is discharged toward the regulator capacitor CT2, the voltage of the inverting input terminal of the comparator circuit COMP2A is larger than the voltage of the non-inverting input terminal of the comparator circuit COMP2A. Therefore, the comparator circuit COMP2A outputs an negative saturation voltage so that the discharge switch QX2 is turned off. At this time, although the output capacitor CO22 is also discharged, the discharge speed of the output capacitor CO21 is faster than the discharge speed of the output capacitor CO22.

When the DC power VO1 is less than the DC power VO2, since the voltage (e.g., the output voltage VAK2) of the regulator capacitor CT2 is larger than the voltage (e.g., the output voltage VAK1) of the regulator capacitor CT1, the regulator capacitor CT2 is discharge toward the regulator capacitor CT1. At this time, the voltage of the non-inverting input terminal of the comparator circuit COMP2A is larger than the inverting input terminal of the comparator circuit COMP2A. Therefore, the comparator circuit COMP2A outputs a positive saturation voltage to turn on the discharge switch QX2. When the discharge switch QX2 is turned on, the discharge switch QX2 and the resistance element 320 form another discharge path. The voltage VO2 of the output capacitor CO22 is released through the discharge switch QX2 and the resistance element 320 to the ground terminal GND. Therefore, the voltage VO2 of the output capacitor CO22 is decreased gradually. At this time, since the regulator capacitor CT2 is discharged toward the regulator capacitor CT1, the voltage of the inverting input terminal of the comparator circuit COMP1A is larger than the voltage of the non-inverting input terminal of the comparator circuit COMP1A. Therefore, the comparator circuit COMP1A outputs an negative saturation voltage so that the discharge switch QX1 is turned off. At this time, although the output capacitor CO21 is also discharged, the discharge speed of the output capacitor CO22 is faster than the discharge speed of the output capacitor CO21.

In some embodiment, the regulator capacitor CT1 is disposed in the conversion circuit 220A to provide power to a feedback compensation circuit (not shown) disposed in the conversion circuit 220A. In this case, the regulator capacitor CT2 is disposed in the conversion circuit 220B to provide power to a feedback compensation circuit (not shown) disposed in the conversion circuit 220B.

Figure 3B:
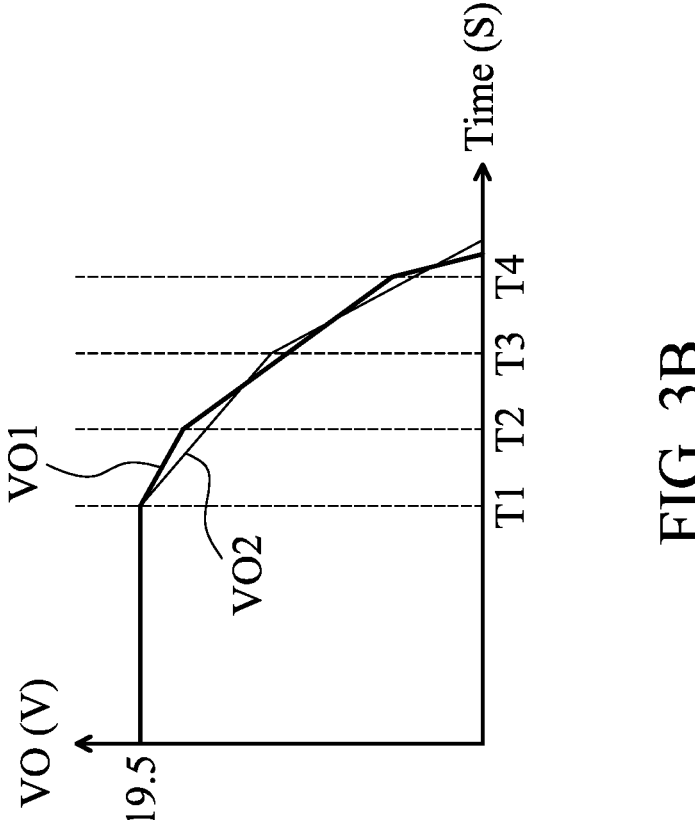
FIG. 3B is a schematic diagram of an exemplary embodiment of a direct current (DC) power according to various aspects of the present disclosure.

FIG. 3B is a schematic diagram of an exemplary embodiment of DC powers VO1 and VO2 according to various aspects of the present disclosure. Before the time point T1, the power supply 110 converts the AC power AC1 to generate the DC power VO1, and the power supply 120 converts the AC power AC2 to generate the DC power VO2. Therefore, the DC power VO1 is equal to the DC power VO2 and maintained at a fixed value, such as 19.5V.

After the time point T1, the power supply 110 does not receive the AC power AC1, and the power supply 120 does not receive the AC power AC2. Therefore, the AC powers AC1 and AC2 are gradually reduced. At the time point T2, since the DC power VO1 is larger than the DC power VO2, the discharge circuit 230A provides the discharge path 231A to rapidly discharge the output capacitor CO21. At the time point T3, since the DC power VO2 is larger than the DC power VO1, the discharge circuit 230B provides the discharge path 231B to rapidly discharge the output capacitor CO22. At the time point T4, since the DC power VO1 is larger than the DC power VO2, the discharge circuit 230A provides the discharge path 231A to rapidly discharge the output capacitor CO21.

Figure 4A:
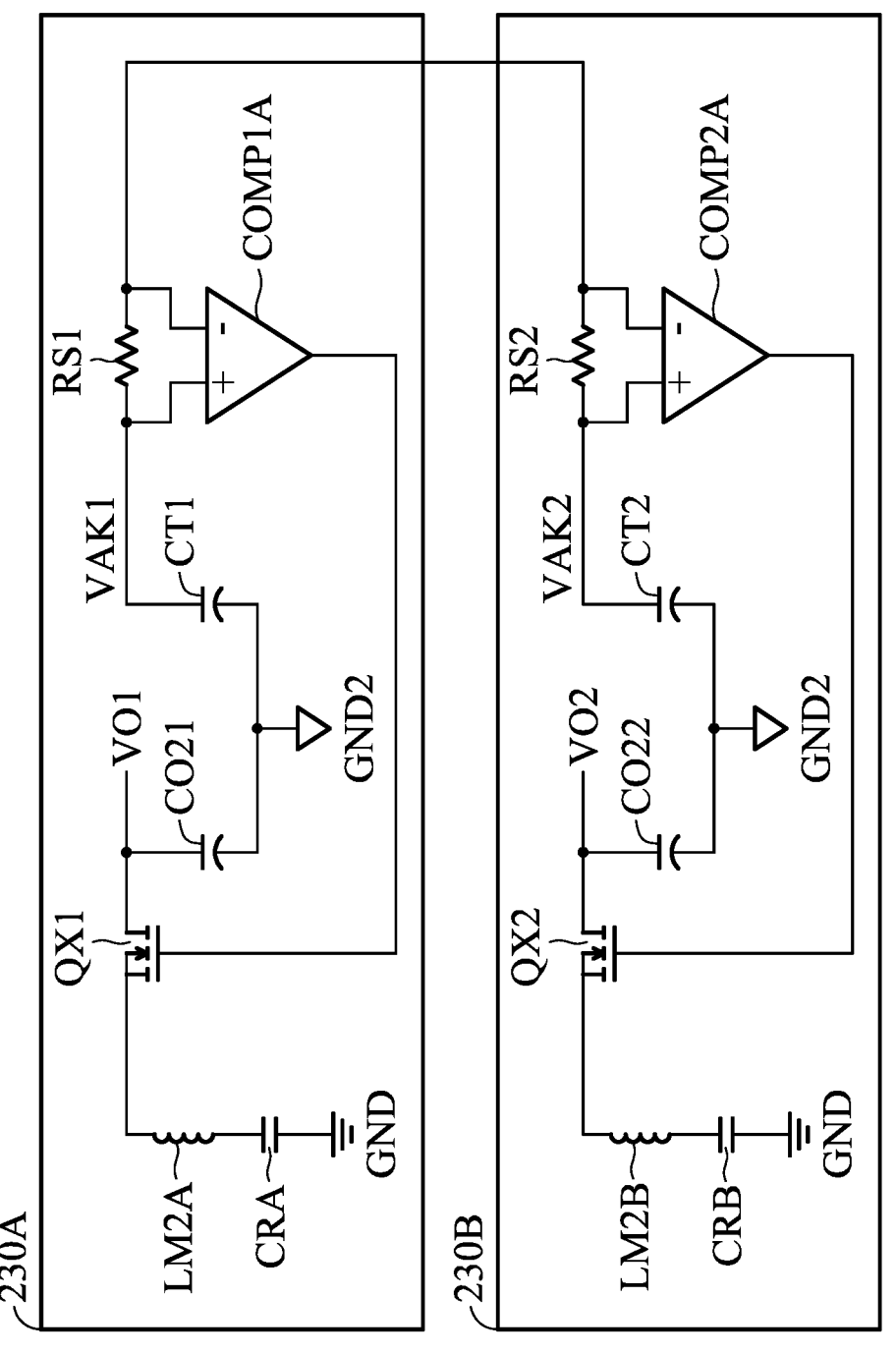
FIG. 4A is a schematic diagram of another exemplary embodiment of the discharge circuit according to various aspects of the present disclosure.

FIG. 4A is a schematic diagram of another exemplary embodiment of the discharge circuits 230A and 230B according to various aspects of the present disclosure. FIG. 4A is similar to FIG. 3A with the exception that the discharge circuits 230A and 230B use the elements of the resonant circuits that are disposed in the conversion circuits 220A and 220B as discharge elements. In this embodiment, when the discharge switch QX1 is turned on, the discharge switch QX1, the inductor LM2A and the capacitor CRA form a discharge path. Additionally, when the discharge switch QX2 is turned on, the discharge switch QX2, the inductor LM2B and the capacitor CRB form another discharge path. In such cases, the inductor LM2A and the capacitor CRA are disposed in the conversion circuit 220A, and the inductor LM2B and the capacitor CRB are disposed in the conversion circuit 220B.

When the DC power VO1 is larger than the DC power VO2, the comparator circuit COMP1A outputs a high level to turn on the discharge switch QX1. Therefore, the voltage VO1 of the output capacitor CO21 is rapidly released through the discharge switch QX1, inductor LM2A, and the capacitor CRA to the ground terminal GND. When the DC power VO2 is larger than the DC power VO1, the comparator circuit COMP2A outputs a high level to turn on the discharge switch QX2. Therefore, the voltage VO2 of the output capacitor CO22 is rapidly released through the discharge switch QX2, inductor LM2B, and the capacitor CRB to the ground terminal GND.

Figure 4B:
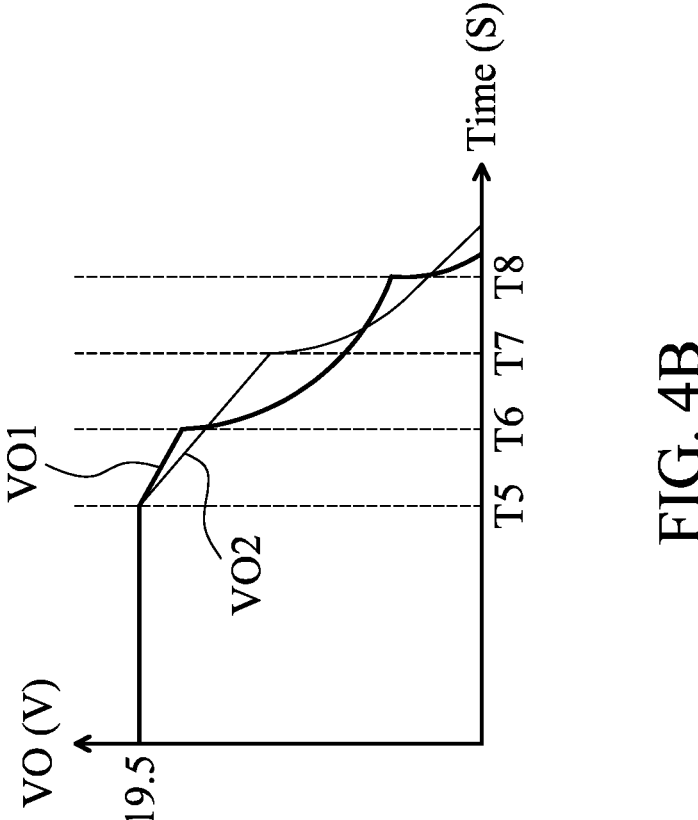
FIG. 4B is a schematic diagram of another exemplary embodiment of the DC power according to various aspects of the present disclosure.

FIG. 4B is a schematic diagram of another exemplary embodiment of the DC power according to various aspects of the present disclosure. Before the time point T5, the power supply 110 converts the AC power AC1 to generate the DC power VO1, and the power supply 120 converts the AC power AC2 to generate the DC power VO2. Therefore, the DC power VO1 is equal to the DC power VO2 and maintained at a fixed value, such as 19.5V.

After the time point T5, the power supply 110 does not receive the AC power AC1, and the power supply 120 does not receive the AC power AC2. Therefore, the AC powers AC1 and AC2 are gradually reduced. At the time point T6, since the DC power VO1 is larger than the DC power VO2, the discharge circuit 230A provides the discharge path 231A to discharge the output capacitor CO21. Therefore, the DC power VO1 is discharged through the elements of the resonant circuit of the conversion circuit 220A to the ground terminal GND. At this time, the output capacitor CO21 performs a resonant discharge, and the output capacitor CO22 performs a normal discharge.

At the time point T7, since the DC power VO2 is larger than the DC power VO1, the discharge circuit 230B provides the discharge path 231B to discharge the output capacitor CO22. Therefore, the DC power VO2 is discharged through the elements of the resonant circuit of the conversion circuit 220B to the ground terminal GND. At this time, the output capacitor CO22 performs a resonant discharge, and the output capacitor CO21 performs a normal discharge.

At the time point T8, since the DC power VO1 is larger than the DC power VO2, the discharge circuit 230A provides the discharge path 231A to discharge the output capacitor CO21. At this time, the output capacitor CO21 performs a resonant discharge, and the output capacitor CO22 performs a normal discharge.

Since the output capacitors CO21 and CO22 are alternately discharged via the inductors and the capacitors, the DC powers VO1 and VO2 are rapidly reduced. Therefore, the system load (e.g., 130 of FIG. 1A) is capable of switching to enter the DC mode. The system load uses the voltage of the built-in battery to maintain operation. In some embodiments, the discharge process of the output capacitors CO21 and CO22 can be called a self-excited rapid discharge. Additionally, since the DC powers VO1 and VO2 are rapidly reduced, an over-voltage protection function does not be triggered.

Figure 5:
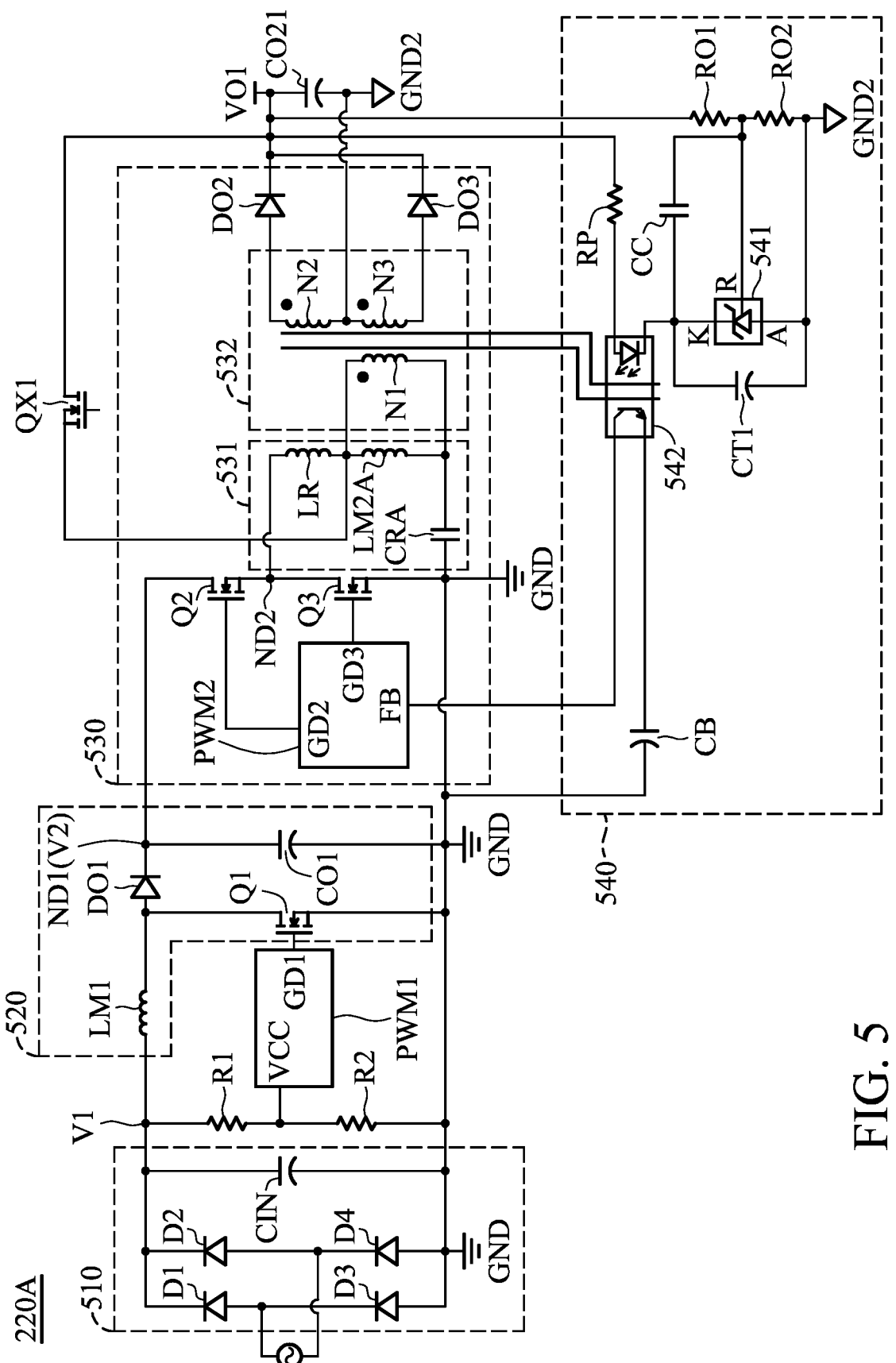
FIG. 5 is a schematic diagram of another exemplary embodiment of a conversion circuit according to various aspects of the present disclosure.

FIG. 5 is a schematic diagram of another exemplary embodiment of the converting circuit 220A according to various aspects of the present disclosure. Since the structures of the conversion circuits 220A and 220B are the same, the structure of the conversion circuit 220A is given as an example in FIG. 5. The conversion circuit 220A comprises an AC-DC converter 510, a boost circuit 520, a buck circuit 530, and a feedback compensation circuit 540.

The AC-DC converter 510 converts the AC power AC1 to a DC voltage V1. The AC power AC1 is about within 90V~264V. The circuit structure of AC-DC converter 510 is not limited in the present disclosure. Any circuit can serve as the AC-DC converter 510, as long as the circuit is capable of converting AC power to DC power. In this embodiment, the AC-DC converter 510 comprises diodes D1-D4 and an input capacitor CIN. The diodes D1-D4 convert the AC power AC1 to generate a pulsation DC voltage. The input capacitor CIN converts the pulsation DC voltage to a stable DC voltage V1. The diodes D1-D4 constitute a bridge-type rectifier.

In other embodiments, the conversion circuit 220A further comprises resistors R1 and R2, and a pulse-width modulation (PWM) circuit PWM1. The resistors R1 and R2 constitute a voltage divider circuit. the voltage divider circuit processes the DC voltage V1 to generate a divided voltage VCC. In this case, the divided voltage VCC is provided as the operation voltage of the PWM circuit PWM1. When the PWM circuit PWM1 receives the divided voltage VCC, the PWM circuit PWM1 generates a switching signal GD1. The switching signal GD1 is a PWM signal.

The boost circuit 520 processes the DC voltage V1 to generate the voltage V2. The structure of the boost circuit 520 is not limited in the present disclosure. Any circuit can serve as the boost circuit 520, as long as the circuit is capable of boosting the DC voltage V1. In this embodiment, the boost circuit 520 comprises a power switch Q1, a boost inductor LM1, an output diode DO1, and a boost capacitor CO1.

The power switch Q1 receives the switching signal GD1 and performs a high frequency switching. In one embodiment, the power switch Q1 is an N-type transistor. The boost inductor LM1 is coupled between the resistor R1 and the power switch Q1. The output diode DO1 is coupled between the boost inductor LM1 and a node ND1. The boost capacitor CO1 is coupled between the node ND1 and the ground terminal GND. When the power switch Q1 is turned on, the boost inductor LM1 stores energy. When the power switch Q1 is turned off, the boost inductor LM1 releases the energy to provide the voltage V2. The boost capacitor CO1 stores the voltage V2. In one embodiment, the voltage V2 is about 400V.

The buck circuit 530 processes the voltage V2 to generate the DC power VO1. In one embodiment, the DC power VO1 is about 19.5V. The structure of buck circuit 530 is not limited in the present disclosure. Any circuit can serve as the buck circuit 530, as long as the circuit is capable of reducing the voltage V2. In some embodiments, the buck circuit 530 adjusts the DC power VO1 according to a feedback signal FB. For example, when the voltage of the feedback signal is reduced, the buck circuit 530 increases the DC power VO1. When the voltage of the feedback signal is increased, the buck circuit 530 reduces the DC power VO1.

In this embodiment, the buck circuit 530 comprises a PWM circuit PWM2, switches Q2 and Q3, a resonant circuit 531, a transformer 532, and output diodes DO2 and DO3. The PWM circuit PWM2 generates the switching signals GD2 and GD3 according to the feedback signal FB. The switching signals GD2 and GD3 are PWM signals. The PWM circuit PWM2 adjusts the duty cycles of the switching signals GD2 and GD3 according to the feedback signal FB. In one embodiment, the switching signals GD2 and GD3 are complementary signals. The switch Q2 receives the switching signal GD2 and is coupled between the nodes ND1 and ND2. The switch Q3 receives the switching signal GD3 and is coupled between the node ND2 and the ground terminal GND. In one embodiment, the switches Q2 and Q3 are N-type transistors. The switches Q2 and Q3 are complementary. For example, when the switch Q2 is turned on, the switch Q3 is turned off. When the switch Q3 is turned on, the switch Q2 is turned off. The resonant circuit 531 is coupled between the node ND2 and the ground terminal GND to generate a resonant voltage. The transformer 532 generates the DC power VO1 according to the resonant voltage.

In this embodiment, the resonant circuit 531 comprises inductors LR and LM2A, and a resonant capacitor CRA. The inductors LR and LM2A, and the resonant capacitor CRA are connected in series with one another between the node ND2 and the ground terminal GND. The inductors LR and LM2A, and the resonant capacitor CRA constitute a LLC resonant tank. The transformer 532 comprises a primary winding N1 and secondary windings N2 and N3. The primary winding N1 is located in one side of the transformer 532. The secondary windings N2 and N3 are located in an opposite side of the transformer 532. The primary winding N1 is connected to the inductor LM2A in parallel to receive the resonant voltage generated by the resonant circuit 531. When the primary winding N1 receives the resonant voltage, the secondary windings N2 and N3 generate induction voltages. The output diode DO2 rectifies the induction voltage generated by the secondary winding N2. The output diode DO3 rectifies the induction voltage generated by the secondary winding N3. The output capacitor CO21 stores the rectified results that serve as the DC power VO1.

In one embodiment, the inductor LM2A and the resonant capacitor CRA of resonant circuit 531 are provided as discharge elements to release the charges of the output capacitor CO21. For example, when the discharge switch QX1 is turned on, the charges of the output capacitor CO21 is discharge to the ground terminal GND via the discharge switch QX1, the inductor LM2A and the resonant capacitor CRA.

The feedback compensation circuit 540 generates the feedback signal FB according to the DC power VO1. In this embodiment, the feedback compensation circuit 540 comprises output resistors RO1 and RO2, a compensation capacitor CC, a voltage regulator 541, a linear optical coupler 542, a turn-on resistor RP, a feedback capacitor CB, and a regulator capacitor CT1.

The output resistors RO1 and RO2 are connected to each other in series and between the DC power VO1 and the ground terminal GND2. In this embodiment, the output resistors RO1 and RO2 form a voltage divider circuit to divide the DC power VO1 and generate a divided voltage. The compensation capacitor CC receives the divided voltage generated by the output resistors RO1 and RO2. The voltage regulator 541 is coupled between the compensation capacitor CC and the ground terminal GND2. In this embodiment, the voltage regulator 541 comprises a reference terminal R, a cathode terminal K and an anode terminal A. The reference terminal R receives the divided voltage generated by the output resistors RO1 and RO2. The cathode terminal K is coupled to the compensation capacitor CC. The anode terminal is coupled to the ground terminal GND2. The regulator capacitor CT1 is coupled between the compensation capacitor CC and the ground terminal GND2. In one embodiment, the voltage of the regulator capacitor CT1 is provided as the output voltage VAK1.

The turn-on resistor RP is coupled between the output capacitor CO21 and the linear optical coupler 542. The linear optical coupler 542 generates the feedback signal FB according to the DC power VO1. In this embodiment, the linear optical coupler 542 comprises a light emitting diode and a bipolar junction transistor. The light emitting diode is coupled between the turn-on resistor RP and the regulator capacitor CT1. The bipolar junction transistor is connected to the feedback capacitor CB in series and between the PWM circuit PWM2 and the ground terminal GND. In this embodiment, the voltage of the feedback capacitor CB is provided as the feedback signal FB.

In this embodiment, the voltage regulator 541 compares the divided voltage generated by the output resistors RO1 and RO2 and a predetermined voltage. When the divided voltage generated by the output resistors RO1 and RO2 is different from the predetermined voltage, the compensation capacitor CC adjusts the voltage gain of the circuit loop and generates a compensation current to turn-on the light emitting diode of the linear optical coupler 542. The light emitted from the light emitting diode of the linear optical coupler 542 isolates the bipolar junction transistor of the linear optical coupler 542, wherein the bipolar junction transistor receive a induced current. The induced current charges the feedback capacitor CB. Next, the PWM circuit PWM2 adjusts the duty cycles of the switching signals Q2 and Q3 according to the voltage of the feedback capacitor CB to make the output voltage stable.

In some embodiments, the power of the voltage regulator 541 is provided by the regulator capacitor CT1. In such cases, the voltage of the regulator capacitor CT1 is about equal to the DC power VO1 minus the voltage of the light emitting diode. Since the voltage of the turn-on resistor RP is lower than 0.05V, it can be omitted. In this embodiment, using the discharge designs of regulator capacitors CT1 and CT2 and the detection resistors RS1 and RS2 of the discharge circuit, the output voltages VAK1 and VAK2 are compared. Then, the voltages of the output capacitors CO21 and CO22 are quickly discharged via the elements of LLC resonant tank.

In other embodiments, the element parameters of the conversion circuit 220A are described in more detail below. The capacitance value of the input capacitor CIN is about 120 uF and the error value of the capacitance value of the input capacitor CIN is about ±10%. The resistance value of the resistor R1 is about 73 KΩ and the error value of the resistance value of the resistor R1 is about ±1%. The resistance value of the resistor R2 is about 73 KΩ and the error value of the resistance value of the resistor R1 is about ±1%. The inductance value of the boost inductor LM1 is about 660 uH and the error value of the inductance value of the boost inductor LM1 is about ±10%. The capacitance value of the boost capacitor CO1 is about 1500 uF and the error value of the capacitance value of the boost capacitor CO1 is about ±20%. The inductance value of the inductor LR is about 54 uH and the error value of the inductance value of the inductor LR is about ±10%. The inductance value of the inductor LM2A is about 480 uH and the error value of the inductance value of the inductor LM2A is about ±10%. The capacitance value of the resonant capacitor CRA is about 33 nF and the error value of the capacitance value of the resonant capacitor CRA is about ±10%. The capacitance value of the output capacitor CO21 is about 4000 uF and the error value of the capacitance value of the output capacitor CO21 is about ±20%. The capacitance value of the regulator capacitor CT1 is about 47 uF and the error value of the capacitance value of the regulator capacitor CT1 is about ±10%. The resistance value of the turn-on resistor RP is about 15 KΩ and the error value of the resistance value of the turn-on resistor RP is about ±1%. The capacitance value of the compensation capacitor CC is about 1.5 nF/50V and the error value of the capacitance value of the compensation capacitor CC is about ±5%. The capacitance value of the feedback capacitor CB is about 100 pF/50V and the error value of the capacitance value of the feedback capacitor CB is about ±10%. It is worth noting that the resistance value, the capacitance value, and the inductance value mentioned above are not limited in the present disclosure. The designers can adjust the resistance value, the capacitance value, and the inductance value according to different requirements It will be understood that when an element or layer is referred to as being "on", "connected to" or "coupled to" another element or layer, it can be directly on, connected or coupled to the other element or layer or intervening elements or layers may be present. In contrast, when an element or layer is referred to as be "directly on", "directly connected to" or "directly coupled to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply comprising: a first conversion circuit converting a first alternating current (AC) power to a first direct current (DC) power; a second conversion circuit converting a second AC power to a second DC power; a first output capacitor configured to store the first DC power; a second output capacitor configured to store the second DC power; a first discharge circuit creating a first discharge path to discharge the first output capacitor in response to the first DC power being greater than the second DC power; and a second discharge circuit creating a second discharge path to discharge the second output capacitor in response to the second DC power being greater than the first DC power, wherein: the first conversion circuit comprises: an AC-DC converter converting the first AC power to a first voltage; a boost circuit processing the first voltage to generate a second voltage; a buck circuit processing the second voltage to generate the first DC power; and a feedback compensation circuit generating a feedback signal according to the first DC power, wherein the buck circuit adjusts the first DC power according to the feedback signal; wherein the buck circuit comprises: a first pulse-width modulation (PWM) circuit generating a first switching signal and a second switching signal according to the feedback signal; a first switch receiving the first switching signal and coupled between a first node and a second node; a second switch receiving the second switching signal and coupled between the second node and the ground terminal; a resonant circuit coupled between the second node and the ground terminal to generate a resonant voltage; and a transformer generating the first DC power according to the resonant voltage.

2. The power supply as claimed in claim 1, wherein the first discharge circuit comprises:

a discharge switch coupled to the first output capacitor;

a resistance element coupled between the discharge switch and the ground terminal; and a comparator circuit turning on the discharge switch in response to the first DC power being greater than the second DC power, wherein in response to the discharge switch being turned on, the discharge switch and the resistance element form the first discharge path.

3. The power supply as claimed in claim 1, wherein the resonant circuit comprises:

a first inductor;

a second inductor; and a resonant capacitor, wherein the first inductor, the second inductor, and the resonant capacitor are connected in series with one another and between the second node and the ground terminal.

4. The power supply as claimed in claim 3, wherein the second inductor is connected to a primary winding of the transformer in parallel.

5. The power supply as claimed in claim 4, wherein the first discharge circuit comprises:

a discharge switch coupled between the first output capacitor and the second inductor; and a comparator circuit turning on the discharge switch in response to the first DC power being greater than the second DC power, wherein in response to the discharge switch being turned on, the discharge switch, the second inductor, and the resonant capacitor form the first discharge path.

6. The power supply as claimed in claim 5, wherein the feedback compensation circuit comprises:

a first voltage divider circuit processing the first DC power to generate a first divided voltage;

a compensation capacitor receiving the first divided voltage and coupled to the comparator circuit;

a voltage regulator coupled between the compensation capacitor and the ground terminal and receiving the first divided voltage;

a linear optical coupler generating the feedback signal according to the first DC power;

a turn-on resistor coupled between the first output capacitor and the linear optical coupler; and a feedback capacitor coupled between the linear optical coupler and the ground terminal.

7. The power supply as claimed in claim 6, wherein the AC-DC converter comprises:

a bridge-type rectifier converting the first AC power to generate the first voltage; and an input capacitor storing the first voltage.

8. The power supply as claimed in claim 7, further comprising:

a second voltage divider circuit processing the first voltage to generate a second divided voltage;

a second PWM circuit receiving the second divided voltage and providing a third switching signal;

a power switch receiving the third switching signal;

a boost inductor coupled between the second voltage divider circuit and the power switch;

an output diode coupled between the boost inductor and the first node; and a boost capacitor coupled between the first node and the ground terminal.

9. A control system comprising: a first power supply comprising: a first input terminal configured to receive a first AC power; a first conversion circuit converting the first AC power to a first DC power; a first output capacitor configured to store the first DC power; a first discharge circuit creating a first discharge path to discharge the first output capacitor in response to the first DC power being greater than a second DC power;

and a first output terminal configured to output the first DC power; a second power supply comprising: a second input terminal configured to receive a second AC power; a second conversion circuit converting the second AC power to the second DC power; a second output capacitor configured to store the second DC power; a second discharge circuit creating a second discharge path to discharge the second output capacitor in response to the second DC power being greater than the first DC power; and a second output terminal configured to output the second DC power; and a system load comprising: a first interface comprising: a first power-receiving terminal; and a first connection terminal, wherein in response to the first output terminal being coupled to the first interface, the first power-receiving terminal receives the first DC power and the first connection terminal is connected to the first discharge circuit; and a second interface comprising: a second power-receiving terminal electrically connected to the first power-receiving terminal; and a second connection terminal electrically connected to the first connection terminal, wherein in response to the second output terminal being coupled to the second interface, the second power-receiving terminal receives the second DC power and the second connection terminal is connected to the second discharge circuit, Wherein:

the first conversion circuit comprises: an AC-DC converter converting the first AC power to a first voltage; a boost circuit processing the first voltage to generate a second voltage; a buck circuit processing the second voltage to generate the first DC power; and a feedback compensation circuit generating a feedback signal according to the first DC power, wherein the buck circuit adjusts the first DC power according to the feedback signal, the buck circuit comprises: a first pulse-width modulation (PWM) circuit generating a first switching signal and a second switching signal according to the feedback signal; a first switch receiving the first switching signal and coupled between a first node and a second node; a second switch receiving the second switching signal and coupled between the second node and the ground terminal; a resonant circuit coupled between the second node and the ground terminal to generate a resonant voltage; and a transformer generating the first DC power according to the resonant voltage.

10. The control system as claimed in claim 9, wherein the first discharge circuit comprises:

a discharge switch coupled to the first output capacitor;

a resistance element coupled between the discharge switch and the ground terminal; and a comparator circuit turning on the discharge switch in response to the first DC power being greater than the second DC power, wherein in response to the discharge switch being turned on, the discharge switch and the resistance element form the first discharge path.

11. The control system as claimed in claim 10, wherein in response to the first output terminal being coupled to the first interface, an inverting input terminal of the comparator circuit is electrically connected to the first connection terminal.

12. The control system as claimed in claim 9, wherein the resonant circuit comprises:

a first inductor;

a second inductor; and a resonant capacitor, wherein the first inductor, the second inductor, and the resonant capacitor are connected in series between the second node and the ground terminal.

13. The control system as claimed in claim 12, wherein the second inductor is connected to a primary winding of the transformer in parallel.

14. The control system as claimed in claim 13, wherein the first discharge circuit comprises:

a discharge switch coupled between the first output capacitor and the second inductor; and a comparator circuit turning on the discharge switch in response to the first DC power being greater than the second DC power, wherein in response to the discharge switch being turned on, the discharge switch, the second inductor, and the resonant capacitor form the first discharge path.

15. The control system as claimed in claim 14, wherein in response to the first output terminal being coupled to the first interface, an inverting input terminal of the comparator circuit is electrically connected to the first connection terminal.

16. The control system as claimed in claim 15, wherein the first power supply comprises:

a voltage divider circuit processing the first DC power to generate a divided voltage;

a compensation capacitor coupled between the voltage divider circuit and a non-inverting input terminal of the comparator circuit;

a voltage regulator coupled between the compensation capacitor and the ground terminal and receiving the divided voltage;

a linear optical coupler generating the feedback signal according to the first DC power;

a feedback capacitor coupled between the linear optical coupler and the ground terminal; and a detection resistor coupled between the inverting input terminal and the non-inverting input terminal.

* * * * *